Jan. 2, 1934.    J. PIGNONE    1,942,118
GAUGE
Filed April 14, 1932
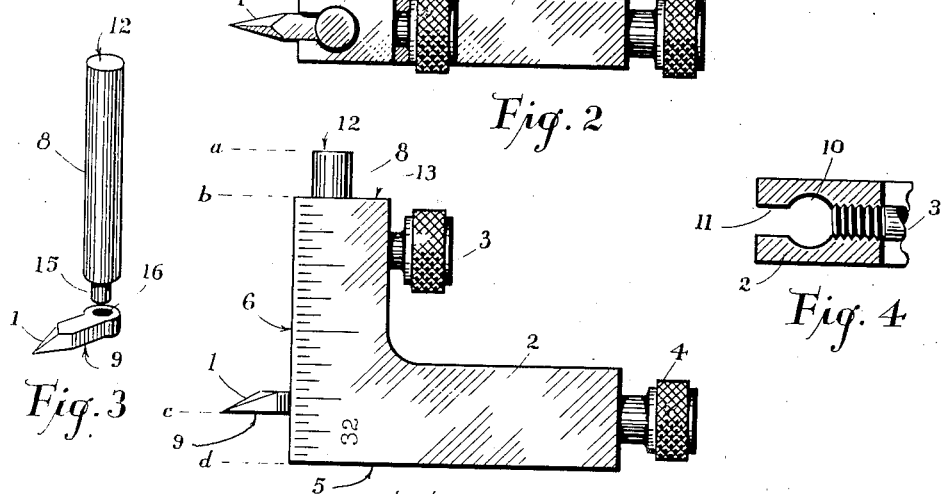
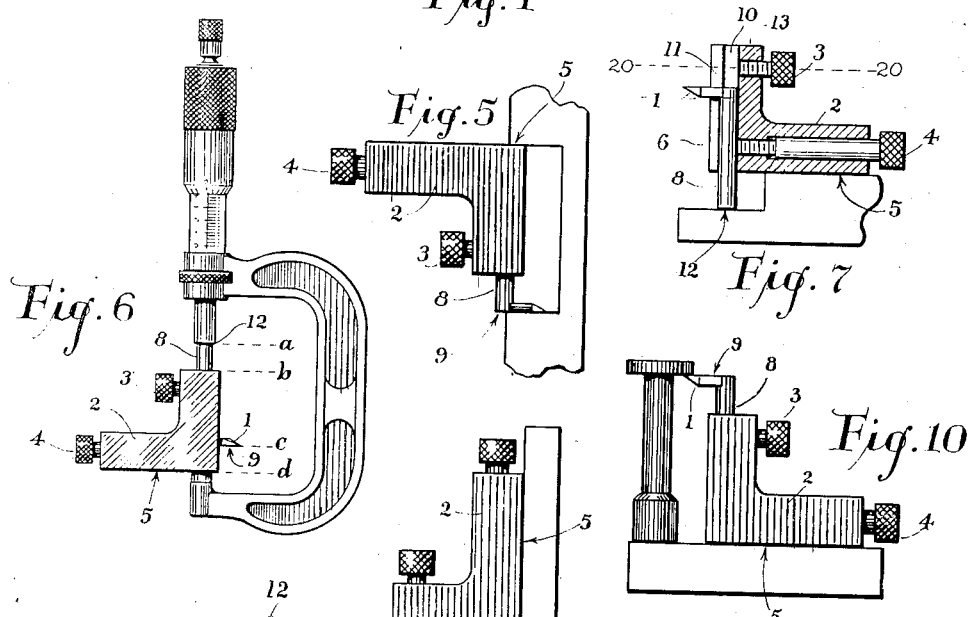

Patented Jan. 2, 1934

1,942,118

UNITED STATES PATENT OFFICE 1,942,118

GAUGE

Joseph Pignone, New York, N. Y.

Application April 14, 1932. Serial No. 605,284

5 Claims. (Cl. 33—169)

This invention relates to improvement in gauges and particularly to the type used for precision measuring and gauging and has for one of its objects to simplify and improve devices of this character.

A further object is to provide a simply constructed inexpensive, durable and accurate instrument whereby various dimensions may be accurately determined and markings made without the necessity of using an entirely different tool and instrument for each gauging or measuring operation, but rather as a supplementary accessory to the micrometer or vernier caliper so that either may be used for taking measurements or transferring them in instances where the form or bulk of these calipers renders them impractical for direct use.

A further object is to provide an instrument capable of many and varied uses as for instance, a surface gauge, inside caliper, try square, height gauge, etc.

Further objects and advantages of the invention will appear from the following disclosure thereof together with the accompanying drawing in which is illustrated the invention embodied in one of its practical commercial forms, but as this illustration is primarily for the purpose of disclosure, it will be understood that the invention is not limited to this particular form of structure and that it may be modified in many respects without departure from the true spirit and scope of the invention as herein defined and claimed.

In the drawing illustrative of an embodiment of the invention,

Fig. 1 is a side elevational view of an embodiment of the invention.

Fig. 2 is a plan view thereof.

Fig. 3 is a perspective view of a detail of the invention showing one form of assembly of sliding rod and marking tool.

Fig. 4 is a fragmentary cross sectional view taken on line 20—20 of Fig. 7.

Fig. 5 is a side view of the device illustrating its use as an inside caliper.

Fig. 6 is a similar view but showing its use in conjunction with a micrometer.

Fig. 7 is a partial sectional elevation of the device and illustrates its use as a depth gauge.

Fig. 8 is a side view of the device and illustrating its application as a surface gauge and marker.

Fig. 9 is a side view of the device and illustrates its use as a try square.

Fig. 10 is a side elevational view showing the use of the device as a height gauge.

In the construction of the improved combination gauge, there is provided a gauge stock 2 preferably of solid steel and machined with its bottom surface 5 precisely square to the front surface 6 and precisely parallel to and at a predetermined standard distance from the machined top surface 13. Extending vertically through the stock 2 is a machined or otherwise formed slot 10—11, the slot portion 10 being cylindrical and communicating with the slot portion 11 which is defined by straight parallel walls, the entire slot being precisely perpendicular to the bottom and top surfaces 5 and 13, respectively.

A rod 8 is slidably and removably disposed in the slot 10 and on one end of the rod 8 there is provided a lateral extension ground or otherwise shaped on its end to form a marking edge, scriber or gauging point 1.

The rod 8 is machined on its ends 9 and 12 to precisely the height b—d of the stock 2 and with its ends precisely parallel to each other and perpendicular to the sides of the rod 8. This rod 8 may be made as shown in Fig. 3 of two parts with a shouldered portion 15 on the rod, force fitted into a recess 16 of the point body, or the point or lateral extension 1 may be formed integral with the rod 8.

It is intended that the rod 8 shall slide with a minimum of working clearance in the slot 10.

Clamp screws 3 and 4 are provided adjacent the upper and lower ends of the stock to clamp the rod 8 in adjusted position.

The stock 2 may be graduated and marked in fractions of an inch along the edge of the surface 6 so that quick approximate measurements or settings may be made.

As shown in Figs. 5 to 10 inclusive, measurements may be taken from objects or transferred to them by considering the respective distances b—d, a—b, c—d, and a—d, (Fig. 1).

When the rod 8 is projected above the upper surface 13 of the stock 2, the clamp screw 3 is used to fix the rod 8 in position, while in cases where the rod is extended below the surface 5 as in Fig. 7, the clamp screw 4 is used for this purpose.

Considering the illustration in Fig. 1, as a basis of reference, examples of setting to a dimension or of measuring a gauged distance are shown in Figs. 5 to 10.

Fig. 5 illustrates the use of the device as an inside caliper and is shown as measuring the distance between two parallel surfaces.

The rod 8 is extended and set in its position by clamp screw 3 and then the distance between the base surface 5 and point surface 9 may be measured by a micrometer as illustrated in Fig. 6.

Fig. 7 shows the use of the device as a depth gauge, the rod 8 being permitted to drop or fit into the recess to be measured before the clamp screw 4 is tightened. The distance between the rod surface 12 and body surface 13 is measured with a micrometer and the standard body height $b-d$ is subtracted from the micrometer measurement, the difference being the depth measurement.

In Fig. 8, the use of the device is illustrated as a surface gauge, the rod 8 being raised so that the distance between the top surface 12 and the base surface 5 is equal to the sum of $b-d$ plus the desired height $c-d$.

With the rod 8 removed the device may be used as a simple tri-square as shown in Fig. 9. An example of the use of the device as a height gauge is shown in Fig. 10, wherein a true and parallel surface 9 is presented to the work and the distance from surface 9 to surface 5 is directly measurable.

It would be understood that while the slot 10—11 is illustrated and described as comprised of a circular hole 10 and a straight slot 11 it is not intended that the invention be limited to the form of slot produced by the two standard machining operations of drilling and slotting. The purpose of the slot 11 is to permit the lateral extension to project beyond the surface 6 of the stock 2 and also to prevent lateral yield or side spring of the extension or marker 1 when it is pressed against a work surface, while the purpose of the hole 10 is to slidably receive the body of the rod 8. Obviously, any form of groove or slot or opening which accomplishes the purpose of the combined forms of hole 10 and slot 11 should be considered as falling within the scope of this invention.

It will likewise be apparent that the gauge stock 2 may be made of any non-yielding material and of pressed or drawn as well as of solid stock.

From the foregoing it will be seen that a simple device for this purpose has been disclosed in the preferred form of its embodiment, but it is not desired to restrict the details to the exact construction shown, it being obvious that changes, not involving the exercise of invention, may be made without conflicting with the scope of the appended claims.

Having thus described my invention, what I claim as new and desire to secure by Letters Patent, is:

1. A combination gauge comprising an L shaped gauge stock having the outer surfaces of the legs precisely at right angles to each other, and adapted for use in association with a surface plate, the base of the L being precisely parallel to the upper end surface of the perpendicular leg, the perpendicular leg being apertured throughout its length and having a communicating slot extending through the outer surface of the latter leg, and a rod slidable through said aperture and provided with a laterally extending pointer slidable through said slot.

2. A combination gauge comprising an L shaped gauge stock having the outer surfaces of the legs precisely at right angles to each other, and adapted for use in association with a surface plate, the base of the L being precisely parallel to the upper end surface of the perpendicular leg, the perpendicular leg being apertured throughout its length and having a communicating slot extending through the outer surface of the latter leg, and a rod slidable through said aperture and provided with a laterally extending pointer slidable through said slot, the length of said rod being exactly equal to the height of the perpendicular leg.

3. A combination gauge comprising an L shaped gauge stock having the outer surfaces of the legs precisely at right angles to each other, and adapted for use in association with a surface plate, the base of the L being precisely parallel to the upper end surface of the perpendicular leg, the perpendicular leg being apertured throughout its length and having a communicating slot extending through the outer surface thereof, and a rod slidable through said aperture and provided with a laterally extending pointer slidable through said slot, the length of said rod being exactly equal to the height of the perpendicular leg, and the ends of the rod being exactly parallel to each other and to the base surface of the stock.

4. A combination gauge comprising an L shaped gauge stock having the outer surfaces of the legs precisely at right angles to each other, and adapted for use in association with a surface plate, the base of the L being precisely parallel to the upper end surface of the perpendicular leg, said latter leg being apertured throughout its length and having a communicating slot extending through the outer surface of said latter leg, a rod slidable through said aperture and provided with a laterally extending pointer slidable through said slot, the length of said rod being exactly equal to the height of the perpendicular leg, and the ends of the rod being exactly parallel to each other and to the base surface of the stock, a clamp screw in each leg serving selectively to secure the rod in positions of adjustment.

5. A combination gauge comprising an L shaped gauge stock having the outer surfaces of the legs precisely at right angles to each other, and adapted for use in association with a surface plate, the base of the L being precisely parallel to the upper end surface of the perpendicular leg, the perpendicular leg being apertured throughout its length and having a communicating slot extending through the outer surface of the latter leg, a rod slidable through said aperture and provided with a laterally extending pointer slidable through said slot, a clamp screw in each leg serving selectively to secure the rod in positions of adjustment.

JOSEPH PIGNONE.